US012030523B2

(12) United States Patent
Weiss et al.

(10) Patent No.: US 12,030,523 B2
(45) Date of Patent: Jul. 9, 2024

(54) AGENT TRAJECTORY PLANNING USING NEURAL NETWORKS

(71) Applicant: Waymo LLC, Mountain View, CA (US)

(72) Inventors: David Joseph Weiss, Wayne, PA (US); Jeffrey Ling, Brooklyn, NY (US)

(73) Assignee: Waymo LLC, Mountain View, CA (US)

( * ) Notice: Subject to any disclaimer, the term of this patent is extended or adjusted under 35 U.S.C. 154(b) by 159 days.

(21) Appl. No.: 17/396,554

(22) Filed: Aug. 6, 2021

(65) Prior Publication Data

US 2023/0040006 A1 Feb. 9, 2023

(51) Int. Cl.
*B60W 60/00* (2020.01)
*G06N 3/045* (2023.01)
*G06V 20/58* (2022.01)

(52) U.S. Cl.
CPC .. *B60W 60/0011* (2020.02); *B60W 60/00274* (2020.02); *G06N 3/045* (2023.01); *G06V 20/584* (2022.01); *B60W 2554/20* (2020.02); *B60W 2554/402* (2020.02)

(58) Field of Classification Search
CPC ....... B60W 60/0011; B60W 60/00274; B60W 2554/20; B60W 2554/402; G06N 3/045; G06V 20/584
See application file for complete search history.

(56) References Cited

U.S. PATENT DOCUMENTS

| 11,003,923 | B2 * | 5/2021 | Ghafarianzadeh | ....... G06N 3/08 |
| 2020/0167650 | A1 * | 5/2020 | Lamy-Poirier | ........... G06T 7/77 |
| 2020/0364507 | A1 * | 11/2020 | Berry | .................... G06F 18/217 |
| 2021/0129871 | A1 * | 5/2021 | Malla | ........................ G06T 7/70 |
| 2022/0212693 | A1 * | 7/2022 | Fang | .................. B60W 60/0011 |
| 2023/0027627 | A1 * | 1/2023 | Schmitt | .................. G06V 10/82 |

OTHER PUBLICATIONS

Carion et al., "End-to-End Object Detection with Transformers," CoRR, May 2020, arxiv.org/abs/2005.12872, 26 pages.

* cited by examiner

*Primary Examiner* — James J Lee
*Assistant Examiner* — Jonathan E Reinert
(74) *Attorney, Agent, or Firm* — Fish & Richardson P.C.

(57) ABSTRACT

Methods, systems, and apparatus, including computer programs encoded on a computer storage medium, for planning the future trajectory of an autonomous vehicle in an environment. In one aspect, a method comprises obtaining multiple types of scene data characterizing a scene in an environment that includes an autonomous vehicle and multiple agents; receiving route data specifying an intended route for the autonomous vehicle; for each data type, processing at least the data type using a respective encoder network to generate a respective encoding of the data type; processing a sequence of the encodings using an encoder network to generate a respective alternative representation for each data type; and processing the alternative representations using a decoder network to generate a trajectory planning output that comprises respective scores for candidate trajectories that represent predicted likelihoods that the candidate trajectory is closest to resulting in the autonomous vehicle successfully navigating the intended route.

20 Claims, 4 Drawing Sheets

AGENT TRAJECTORY PLANNING USING NEURAL NETWORKS

BACKGROUND

This specification relates to planning the future trajectory of an autonomous vehicle in an environment.

The environment may be a real-world environment, and the autonomous vehicle can be, e.g., an automobile in the environment.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various planning tasks, e.g., object classification within images or route planning. For example, a neural network can be used to determine that an image captured by an on-board camera is likely to be an image of a nearby car. Neural networks, or for brevity, networks, are machine learning models that employ multiple layers of operations to generate one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make planning outputs in a production system.

SUMMARY

This specification describes a system implemented as computer programs on one or more computers in one or more locations that plans the future trajectory of an autonomous vehicle in an environment.

According to a first aspect there is provided a method performed on one or more computers, the method comprising: obtaining a plurality of types of scene data characterizing a scene in an environment that includes, at a current time point, an autonomous vehicle and one or more agents, the plurality of types of scene data comprising: (i) agent state data characterizing respective states of the one or more agents as of the current time point; and (ii) autonomous vehicle data characterizing a state of the autonomous vehicle as of the current time point; receiving route data specifying an intended route for the autonomous vehicle after the current time point; for each of the plurality of types of scene data, processing at least the scene data of the type using a respective encoder neural network corresponding to the type to generate a respective encoding of the scene data of the type; processing at least the route data using a route data encoder neural network to generate a respective encoding for the route data; processing a sequence comprising the respective encodings of each of (i) the route data and (ii) each of the plurality of types of scene data using an encoder neural network to generate a respective alternative representation for each of (i) the route data and (ii) each of the plurality of types of scene data; and processing the respective alternative representations for each of (i) the route data and (ii) each of the plurality of types of scene data using a decoder neural network to generate a trajectory planning output that comprises a respective score for each of a plurality of candidate future trajectories for the autonomous vehicle that represents a predicted likelihood that the candidate trajectory is closest to a trajectory that would result in the autonomous vehicle successfully navigating the intended route after the current time point.

In some implementations, the plurality of types of scene data further comprises static state data characterizing static features of the scene.

In some implementations, the static state data comprises roadgraph data.

In some implementations, the plurality of types of scene data further comprises dynamic state data characterizing dynamic features of the scene.

In some implementations, the dynamic state data comprises traffic light state data.

In some implementations, processing the respective alternative representations for each of (i) the route data and (ii) each of the plurality of types of scene data using the decoder neural network comprises: obtaining a set of queries comprising a respective learned query for each of the plurality of candidate trajectories; and processing the respective learned queries using a sequence of one or more context neural network blocks, wherein each context neural network block is configured to update the set of queries, and wherein one or more of the context neural network blocks are each configured to update the set of queries using the respective alternative representations for each of (i) the route data and (ii) each of the plurality of types of scene data.

In some implementations, processing the respective alternative representations for each of (i) the route data and (ii) each of the plurality of types of scene data using a decoder neural network further comprises: processing the updated set of queries generated by a last context neural network block in the sequence using a trajectory probability neural network head to generate the respective scores for each of the plurality of candidate trajectories.

In some implementations, the trajectory planning output further comprises, for each of the plurality of candidate trajectories, a respective regression output that characterizes a probability distribution that defines, for each of a plurality of future time points after the current time point corresponding to the candidate trajectory, respective likelihoods that the autonomous vehicle will occupy respective spatial positions at the future time point given that the candidate trajectory is the closest to a trajectory that would result in the autonomous vehicle successfully navigating the intended route after the current time point.

In some implementations, processing the respective alternative representations for each of (i) the route data and (ii) each of the plurality of types of scene data using a decoder neural network further comprises: processing the updated set of queries generated by a last context neural network block in the sequence using a trajectory regression neural network head to generate the respective regression output for each of the plurality of candidate trajectories.

In some implementations, the respective encoder neural network corresponding to the agent state data is an interaction encoder neural network, wherein the interaction encoder neural network processes at least the agent state data and the autonomous vehicle data.

In some implementations, the interaction encoder neural network comprises one or more pairwise feature pooling layers.

In some implementations, the interaction encoder neural network comprises one or more multicontext gating neural network blocks, wherein the multicontext gating neural network block at each of a plurality of iterations updates a respective context vector and one or more feature vectors, wherein updating the context vector and the feature vectors comprises: obtaining the initial context vector and the initial feature vectors; at each of a plurality of iterations: processing the current feature vectors using a feature neural network to generate a respective representation of each of the feature vectors; processing the current context vector using a context neural network to generate a representation of the context vector; for each feature vector, determining the updated feature vector as the elementwise multiplication of the representation of the feature vector and a function of the representation of the context vector; and determining the updated context vector using a pooling layer to process the updated feature vectors.

In some implementations, the respective encoder neural network corresponding to the autonomous vehicle data is a raw state encoder neural network, wherein the raw state encoder neural network comprises one or more LSTM neural network layers.

In some implementations, the static scene data and route data are represented as one or more polylines.

In some implementations, the respective encoder neural network corresponding to the static scene data is a polyline encoder neural network, wherein the polyline encoder neural network processes at least polylines representing the static scene data and the route data.

In some implementations, the polyline encoder comprises one or more multilayer perceptron neural network layers.

In some implementations, the polyline encoder comprises one or more pooling layers.

In some implementations, the polyline encoder comprises one or more multicontext gating neural network blocks, wherein the multicontext gating neural network block at each of a plurality of iterations updates a respective context vector and one or more feature vectors, wherein updating the context vector and the feature vectors comprises: obtaining the initial context vector and the initial feature vectors; at each of a plurality of iterations: processing the current feature vectors using a feature neural network to generate a respective representation of each of the feature vectors; processing the current context vector using a context neural network to generate a representation of the context vector; for each feature vector, determining the updated feature vector as the elementwise multiplication of the representation of the feature vector and a function of the representation of the context vector; and determining the updated context vector using a pooling layer to process the updated feature vectors.

In some implementations, the respective encoder neural network corresponding to the dynamic scene data is a dynamic feature encoder neural network, wherein the dynamic feature encoder neural network comprises one or more LSTM neural network layers.

In some implementations, the route data encoder neural network comprises one or more 1D dilated convolutional layers.

In some implementations, the method further comprises: receiving hint data that characterizes an intended future state of the scene of the environment after the current time point, wherein: (i) one or more of the respective encoders for the plurality of types of scene data, (ii) the route data encoder, or (iii) both are conditioned on the hint data; and wherein the predicted likelihood is a predicted likelihood that the candidate trajectory is closest to a trajectory that would result in the autonomous vehicle successfully navigating the intended route after the current time point given that the scene transitions into the intended future state after the current time point.

Particular embodiments of the subject matter described in this specification can be implemented so as to realize one or more of the following advantages.

The system described in this specification can generate a trajectory planning output for an autonomous vehicle in an environment. The system can be configured to generate respective encodings of (1) route data specifying an intended route for the vehicle after a current time point and (2) each of multiple types of scene data using a set of encoders. Each encoder can be configured to process at least a respective type of data to generate an encoding of the data type. The system can be configured to generate a respective alternative representation of each encoding using a sequence encoder to process a sequence of the generated encodings. The system can then process the alternative representations using a decoder neural network to generate a trajectory planning output for the autonomous vehicle in the environment that includes a respective score for each of multiple candidate future trajectories for the autonomous vehicle that represents a predicted likelihood that the candidate trajectory is closest to a trajectory that would result in the autonomous vehicle successfully navigating the intended route after the current time point. Processing the encodings using a sequence encoder (e.g., a neural network that for each encoding processes the other encodings as context for the encoding to generate a respective alternative representation of the encoding) and decoder neural network can generate trajectory planning outputs which achieve better performance than other standard trajectory planning models (e.g., by the autonomous vehicle successfully navigating the environment to an intended destination a higher percentage of the time).

The system can be configured to process hint data in addition to the types of scene data and the route data. Hint data can characterize an intended future state of the scene of the environment after the current time point (e.g., provided by ground truth in training or a planning system at inference). The system can condition the respective encoders of one or more types of scene data, the respective encoder of the route data, or both, on the hint data, such that the predicted likelihood is a predicted likelihood that the candidate trajectory is closest to a trajectory that would result in the autonomous vehicle successfully navigating the intended route after the current time point given that the scene transitions into the intended future state after the current time point. Conditioning the encoders on the hint data can enable a degree of controllability over the trajectory planning system, e.g., by supplying hint data which characterizes an intended route for the autonomous vehicle in the environment, or semantic data for one or more other agents in the environment (e.g., to pass or not pass an agent that is a vehicle in the environment). Enabling a degree of controllability over the system can enable fine-tuning the performance of the autonomous vehicle in a semantic way, such as passing in specific instances, or following a particular route through the environment. The hint data can further include an unspecified control decision, which can enable a system conditioned on the hint data to reduce dependence on the hint data, or to evaluate the performance of the system without an explicit hint.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an autonomous vehicle, e.g., automobile, can use a trained machine learning model, referred to in this specification as a "trajectory planning system," to generate a trajectory planning output.

Figure 1:
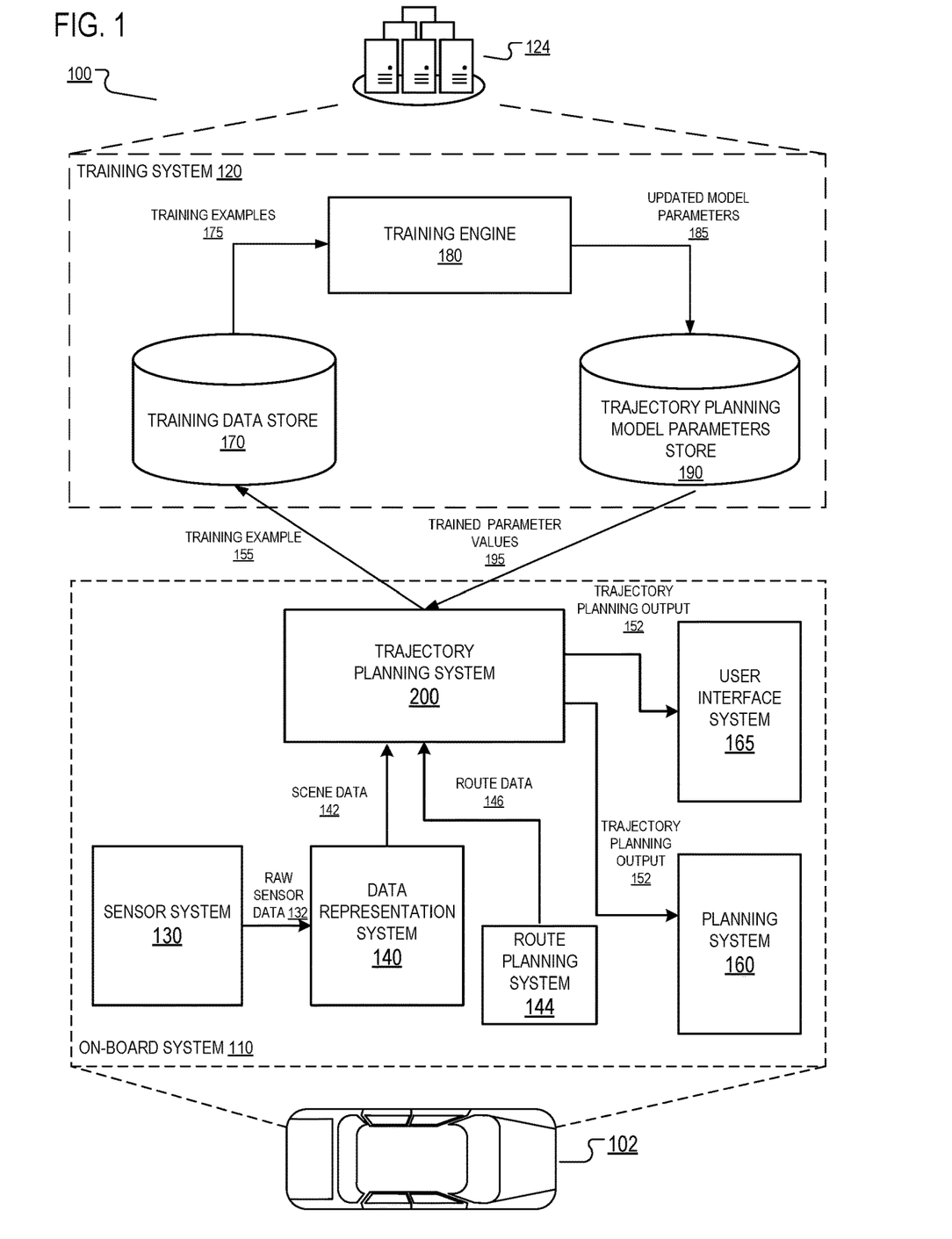
FIG. 1 is a block diagram of an example system.

FIG. 1 shows an example system 100. The system 100 is an example of a system implemented as computer programs on one or more computers in one or more locations in which the systems, components, and techniques described below are implemented. The system 100 includes an on-board system 110 and a training system 120.

The on-board system 110 is located on-board an autonomous vehicle 102. The autonomous vehicle 102 in FIG. 1 is illustrated as an automobile, but the on-board system 102 can be located on-board any appropriate autonomous vehicle type. The autonomous vehicle 102 can be a fully autonomous vehicle that determines and executes fully-autonomous driving decisions in order to navigate through an environment. The autonomous vehicle 102 can also be a semi-autonomous vehicle that uses planning outputs to aid a human driver. For example, the autonomous vehicle 102 can autonomously apply the brakes if a planning output indicates that a human driver is about to collide with another vehicle.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and generates scene data 142. The scene data 142 characterizes the current state of the environment surrounding the vehicle 102 as of the current time point.

For example, the scene data can characterize, for one or more agents, e.g., other vehicles, pedestrians, cyclists, etc., in the environment, a current state at the current time point and a previous state at one or more respective previous time points. In other words, the scene data can include, for one or more agents in the environment, data that characterizes a previous trajectory of the agent in the environment up to the current time point. The state of an agent at a time point can include the location of the agent at the time point and, optionally, values for a predetermined set of motion parameters at the time point. As a particular example, the motion parameters can include a heading for the agent, a velocity of the agent, and/or an acceleration of the agent. In another example, one or more agents in the environment can be represented jointly, e.g., by a state describing the position, dimensions, and velocity of the joint representation (e.g., the position, velocity, and horizontal dimensions of a crowd of pedestrians).

In some implementations, the scene data also includes data characterizing a current state of the autonomous vehicle at the current time point and a previous state of the autonomous vehicle at one or more respective previous time points.

In some implementations, the scene data also includes data characterizing features of the environment. These features can include (i) dynamic features of the environment, e.g., traffic light states at the current time point, (ii) static features of the environment, e.g., roadgraph data characterizing one or more of lane connectivity, lane type, stop lines, speed limits, and so on, of roadways in the vicinity of the autonomous vehicle or (iii) both. In one example, the dynamic features of the environment can be represented by a combination of polylines (e.g., for the position of the feature) and one-hot encoding vectors (e.g., one-hot encodings for the red-yellow-green lights of a traffic light, with polylines representing the position in the environment). The static features of the environment can be represented by polylines. For features represented by polylines, the features can be converted to feature vectors (e.g., represented by x, y points with vector directions in the environment, such as numerical values representing x, y positions and a heading) prior to the system using them.

The data representation system 140 provides the scene data 142 to a trajectory planning system 200, also on-board the vehicle 102.

A route planning system 144 provides route data 146 to the trajectory planning system 200. The route data 146 is an output generated by a planning system that characterizes how the autonomous vehicle should navigate in a future time window in order to follow a designated route. The route data 146 reflects a determination by the planning system that the autonomous vehicle should follow a route characterized by the route data 146 in order to satisfy certain criteria. The route characterized by the route data 146 can be, e.g., a high level intended route for the autonomous agent embedded in the roadgraph for the environment with no notion of time. The certain criteria can include, e.g., a set of one or more traffic laws (e.g., speed limit, right of way, lane traversal, etc.), a set of one or more safety regulations (e.g., minimum following distances, adjustments to speed given weather conditions, etc.), and a set of one or more goal criteria (e.g., an intended destination, minimum deviation from a template path when confronted with dynamic road conditions, etc.). The route data 146 can be represented by, e.g., an ordered set of points with vector directions for the intended route (e.g., x, y positions with vector directions). Each point can represent a waypoint spatial location in a sequence of waypoint spatial locations s for the autonomous vehicle to follow to reach an intended destination, e.g., a sequence of evenly-spaced waypoint spatial locations that are each constrained to fall on a feature that is present in the roadgraph, e.g., to fall on a path that is represented in the roadgraph, e.g., a path that traverses the center of any given driving lane.

The trajectory planning system 200 processes the scene data 142 and the route data 146 to generate a trajectory planning output 152. The trajectory planning output 152 characterizes the future trajectory of the autonomous vehicle after the current time point.

For example, the trajectory planning output 152 for the autonomous vehicle includes data characterizing a respective score for each of a plurality of candidate future trajectories. Each candidate future trajectory characterizes a different possible future trajectory of the autonomous vehicle after the current time point and includes data specifying a sequence of spatial locations in the environment that each correspond to a possible position of the autonomous vehicle at a respective future time point that is after the current time point. In other words, each candidate trajectory identifies a different sequence of spatial locations (e.g., each including an x position, y position, speed, and yaw) in the environment that may be traversed by the autonomous vehicle after the current time point. The candidate trajectories can be generated by the trajectory planning system 200, e.g., by updating a set of learned queries using the scene data 142 and route data 146, where each learned query corresponds to a particular candidate trajectory. Generating the trajectory planning output will be described in more detail below with reference to FIGS. 2 and 3.

The on-board system 110 also includes a planning system 160. The planning system 160 can generate an intended route at inference for the autonomous vehicle to follow in the environment. The planning system 160 provides the intended route to the trajectory planning system 200, and obtains in response the trajectory planning output generated by the trajectory planning system 200.

The on-board system 100 can provide the trajectory planning output 152 generated by the trajectory planning system 200 to one or more other on-board systems of the vehicle 102, e.g., the planning system 160 and/or a user interface system 165.

When the planning system 160 receives the trajectory planning output 152, the planning system 160 can use the trajectory planning output 152 to generate planning decisions that plan a future trajectory of the vehicle, i.e., to generate a new planned vehicle path. In some implementations, the planning system 160 can use the trajectory planning output 152 to evaluate the cost for each of multiple potential vehicle paths that characterize respective paths that the autonomous vehicle 102 could follow in the future (e.g., evaluating the deviation from an optimal path when considering dynamic road conditions, evaluating the safety in terms of collision risk for each path, etc.). In some implementations, the planning system 160 can sample from the trajectory planning output 152 directly and cause the autonomous vehicle to follow the sampled planned trajectory. In some implementations, the planning system 160 can determine a mean path from the trajectory planning output 152 by averaging the paths in accordance with their respective scores.

When the user interface system 165 receives the trajectory planning output 152, the user interface system 165 can use the trajectory planning output 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102).

To generate the trajectory planning output 152, the trajectory planning system 200 can use trained parameter values 195, i.e., trained model parameter values of the trajectory planning system 200, obtained from a trajectory planning model parameters store 190 in the training system 120. The training system 120 can train the trajectory planning system 200 using any of a variety of imitation learning techniques, e.g., using a behavior cloning technique, an adversarial imitation learning technique, or a DAgger (data aggregation) imitation learning technique from driving logs generated by other autonomous vehicles or manually driven vehicles.

The training system 120 is typically hosted within a data center 124, which can be a distributed computing system having hundreds or thousands of computers in one or more locations.

The training system 120 includes a training data store 170 that stores all the training data used to train the trajectory planning system i.e., to determine the trained parameter values 195 of the trajectory planning system 200. The training data store 170 receives raw training examples from agents operating in the real world. For example, the training data store 170 can receive a raw training example 155 from an agent, e.g., a manually driven vehicle or autonomous vehicle controlled using a different planning system. The raw training example 155 can be processed by the training system 120 to generate a new training example. The raw training example 155 can include scene data and route data, e.g., like the scene data 142 and route data 146, that can be used as input for a new training example. The raw training example 155 can also include outcome data characterizing the state of the environment surrounding the autonomous vehicle 102 at the one or more future time points. This outcome data can be used to generate a ground truth trajectory for the autonomous vehicle at the time point characterized by the scene data. The ground truth trajectory identifies the actual trajectory (as derived from the outcome data) traversed by the autonomous vehicle 102 at the future time points. For example, the ground truth trajectory can identify spatial locations in an autonomous vehicle-centric coordinate system to which the autonomous vehicle moved at each of multiple future time points.

The training data store 170 provides training examples 175 to a training engine 180, also hosted in the training system 120. The training engine 180 uses the training examples 175 to update model parameters that will be used by the trajectory planning system 200, and provides the updated model parameters 185 to the trajectory planning model parameters store 190. Once the parameter values of the trajectory planning system 200 have been fully trained, the training system 120 can send the trained parameter values 195 to the trajectory planning system 200, e.g., through a wired or wireless connection.

Figure 2:
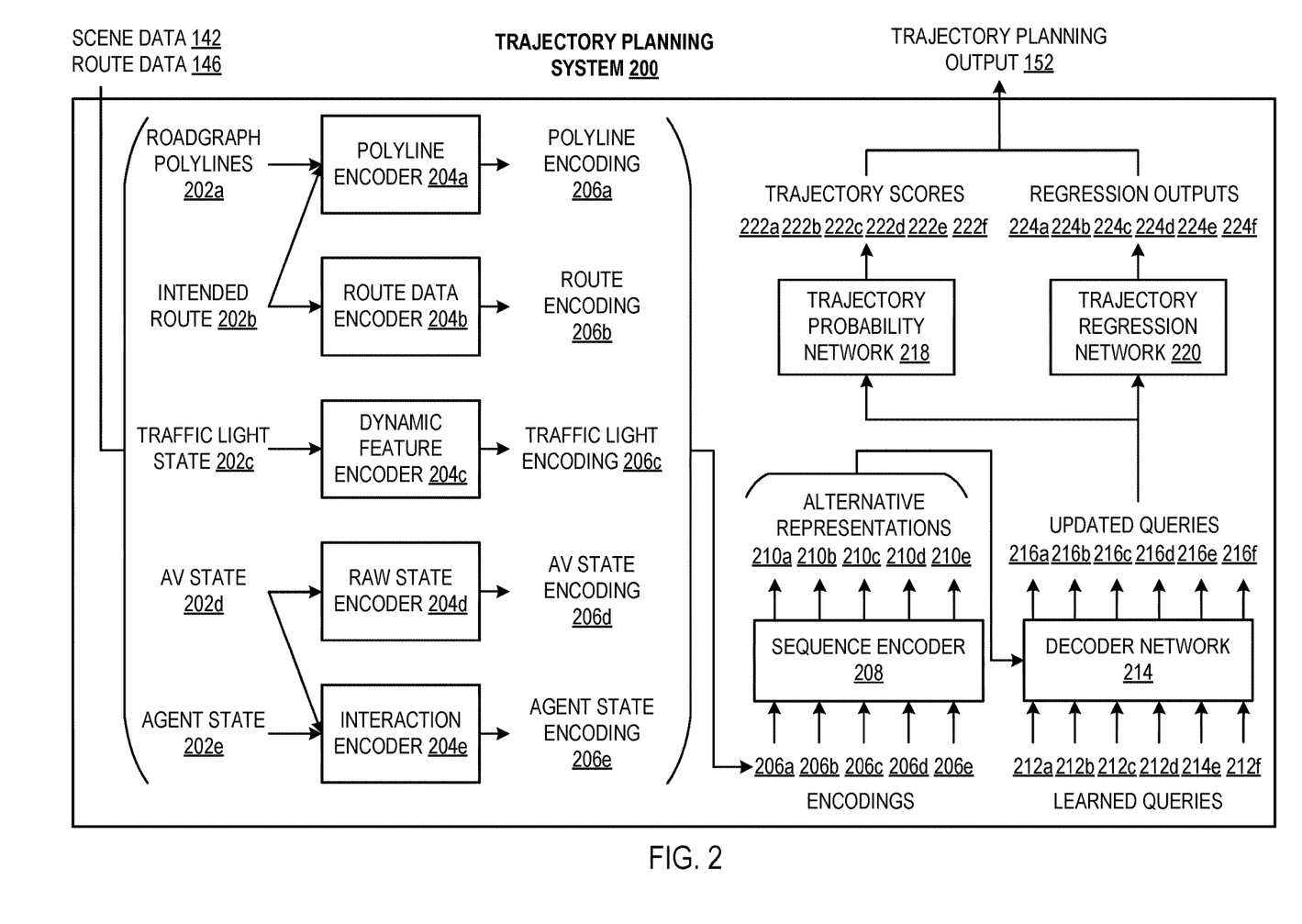
FIG. 2 is a block diagram of an example trajectory planning system.

FIG. 2 is a block diagram of an example trajectory planning system 200. The trajectory planning system 200 is an example of a system implemented as computer programs on one or more computers in one or more locations in which the systems, components, and techniques described below are implemented.

The trajectory planning system 200 processes scene data 142 and route data 146 to generate a trajectory planning output 152 that characterizes the scene data 142 and route data 146.

The scene data can include multiple types of scene data characterizing a scene in an environment that includes an autonomous vehicle and one or more agents, e.g., agent state data characterizing respective sates of one or more agents as of the current time point, autonomous vehicle data characterizing a state of the autonomous vehicle as of the current time point, static state data characterizing static features of the scene, dynamic state data characterizing dynamic features of the scene, or any combination thereof.

The route data specifies an intended route for the autonomous vehicle after the current time point.

For example, the scene data can include roadgraph polylines 202a characterizing multiple classes of static objects in the environment (e.g., feature vectors including x, y points with vector directions representing the polylines that characterize the multiple classes of static objects), traffic light state 202c characterizing the state of traffic lights in the environment (e.g., represented by a history of one-hot encodings of the red-yellow-green state of the traffic light at each of multiple previous time points before the current time point), av (autonomous vehicle) state 202d characterizing a state of the autonomous vehicle in the environment (e.g., represented by a history of numerical values representing the position, velocity, and acceleration of the autonomous vehicle at each of multiple previous time points before the current time point), and agent state 202e characterizing the state of one or more other agents in the environment (e.g., represented by a respective history of numerical values for each of the one of more agents representing the position, velocity, and acceleration of the agent at each of multiple previous time points before the current time point). The route data can include, e.g., intended route 202b characterizing an intended route for the autonomous vehicle (e.g., represented by a set of ordered numerical values, such as a vector or matrix of numerical values). The intended route can be a series of waypoints in the environment (e.g., x, y positions with vector directions embedded in the roadgraph with no notion of time). In contrast, the trajectory planning output generated by the trajectory planning system 200 can include more information (e.g., including time information) at any resolution (e.g., x, y positions; x, y position uncertainties; speed, and heading; etc at each of multiple time points).

In some implementations, the trajectory planning system can also process hint data from a planning system in addition to the scene data 142 and route data 146 to generate the trajectory planning output 152. The planning system can generate the hint data to control the trajectory planning output generated by the trajectory planning system. The hint data can characterize a future state of the environment, (e.g., a future state of the autonomous vehicle or an agent in the environment), semantic information pertaining to the autonomous vehicle (such as a control decision for the autonomous vehicle to turn left, turn right, or go straight), or semantic information pertaining to an agent in the environment (e.g., whether the autonomous vehicle should pass the agent while following the intended route). The trajectory planning system receiving hint data in addition to the scene data and route data is described in further detail with reference to FIG. 4.

The trajectory planning system 200 can be configured to generate any appropriate trajectory planning output, e.g., trajectory planning output 152. For example, the trajectory planning output 152 can characterize a probability distribution that defines, for each of multiple future time points after the current time point, respective likelihoods that the autonomous vehicle will occupy respective spatial positions at future time points. That is, the likelihood for a given position at a given time point is the likelihood based on training data that the autonomous vehicle should occupy the given position at the given time point if attempting to follow the intended route subject to safe driving constraints.

The trajectory planning system 200 includes a respective encoder for each of the multiple types of scene data 142 and for the route data 146. For each type of data, the trajectory planning system 200 processes at least the type of data with a corresponding encoder neural network to generate a single encoding vector of that type of data. The encoding vector of a data type can be represented, e.g., by a collection of ordered numerical values, such as a vector of numerical values, and characterizes the data type across multiple previous time points before the current time point. Thus, the respective encoding vector of a data type represents a summary of the state of the data type over a recent time window leading up to the current time point.

The encoder neural networks can have any appropriate neural network architecture that enables it to perform its described function, i.e., processing at least the corresponding data type to generate an encoding for that data type. In particular, each encoder neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers).

One or more of the encoder neural networks can include a multicontext gating block. A multicontext gating block processes a context vector and feature vectors (e.g., roadgraph polylines 202a represented as feature vectors characterizing the polylines, intended route 202b, av state 202d, or agent state 202e) to generate an updated context vector and updated feature vectors. The updated context vector will be feature-aware (that is, updated using the feature vectors) and the updated feature vectors will be context-aware (that is, updated using the context vector). The context vector can be represented by, e.g., a collection of ordered numerical values, such as a vector of numerical values, that characterize the environment. The feature vectors can be represented by, e.g., a collection of ordered numerical values, such as a vector of numerical values, that characterize particular features (e.g., roadgraph polylines represented by x, y points with vector directions) in the environment.

The multicontext gating block includes MLP layers and a max pooling layer to process the feature vectors and the context vector to generate the updated context vector and the updated feature vectors. The MLP layers include a feature MLP layer to process the feature vectors and a context MLP layer to process the context vector. The feature MLP layer can process each feature vector to generate a respective representation of the feature vector. The context MLP layer can process the context vector to generate a representation of the context vector. The representations of the feature vectors and the context vectors can be represented by, e.g., a collection of ordered numerical values, such as a vector or matrix of numerical values.

For each feature vector representation, the multicontext gating block performs an elementwise multiplication between the feature vector representation and an elementwise sigmoid function of the context vector representation to generate a respective updated feature vector.

The multicontext gating block applies the max pooling layer across the updated feature vectors to generate the updated context vector.

The encoder neural networks can apply the multicontext gating block multiple times, e.g., K times. The updated context vector and updated feature vectors generated as output from a $k^{th}$ application can be processed as input to the $(k+)^{th}$ application. The updated context vector and updated feature vectors generated as output from the final application of the context gating block, e.g., a $K^{th}$ application, are the output of the context gating block.

The trajectory planning system 200 processes the roadgraph polylines 202a (e.g., represented as x, y points with vector directions) and the intended route 202b using a polyline encoder 204a to generate polyline encoding 206a. For example, the polyline encoder can include one or more multilayer perceptron (MLP) layers, one or more max pooling layers, and a multicontext gating block. The polyline encoder 204a can generate a context vector for the multicontext gating block by processing the av state 202d using an MLP layer and the traffic light state 202c using an LSTM layer. The polyline encoder 204a can generate the context vector as a concatenation of the processed av state 202d and the processed traffic light state 202c. The polyline encoder 204a can process each polyline (e.g., represented by x, y points with a vector direction) using the MLP and pooling layers to generate the respective feature vectors, and process the generated context and feature vectors using the multicontext gating block. The polyline encoding 206a can be the final updated context vector.

The trajectory planning system 200 processes the intended route 202b using a route data encoder 204b to generate route encoding 206b. For example, the route data encoder 204b can include one or more 1D dilated convolutional layers to process the route encoding 206b (e.g., represented as by a collection of ordered sets of numerical values, each set characterizing a position along the intended route). The 1D dilated convolution layers can each include respective numbers of filters, with each filter having respective sizes and dilation rates.

The trajectory planning system 200 processes the traffic light state 202c using dynamic feature encoder 204c to generate traffic light encoding 206c. For example, the dynamic feature encoder 204c can include one or more recurrent neural network layers, e.g., one or more LSTM layers, to process a traffic light state 202c represented by, e.g., a history of traffic light states at each of the current time point and multiple previous time points before the current time point.

The trajectory planning system 200 processes the av (autonomous vehicle) state 202d using raw state encoder 204d to generate av state encoding 206d. For example, the raw state encoder 204d can include one or more recurrent neural network layers, e.g., one or more LSTM layers, to process an av state 202d represented by, e.g., a history of the av states at each of the current time point and multiple previous time points before the current time point.

The trajectory planning system 200 processes the agent state 202e and av state 202d using interaction encoder 204e to generate agent state encoding 206e. For example, the interaction encoder 204e can include a multicontext gating block. The interaction encoder 204e can generate feature vectors as the respective pairwise features between the av state 204d and each agent state of the one or more agents represented by agent state 202e (e.g., represented by the relative state of the agent with respect to autonomous vehicle state, such as relative position, relative velocity, etc.). The context vector can be a concatenation of multiple agent state encoding vectors from previous time points before the current time point. The multicontext gating block can process the pairwise feature vectors and the context vector to generate the agent state encoding 206e as the updated context vector.

Thus, the single vector encodings for the scene data represent the scene at multiple previous time points before the current time point. The trajectory planning system 200 processes the single vectors representing each type of scene data and the single vector representing the route data to generate the trajectory planning output.

The trajectory planning system 200 generates a respective alternative representation (e.g., alternative representations 210a, 210b, 210c, 210d, and 210e) of each of the sequence of encodings (e.g., polyline encoding 206a, route encoding 206b, traffic light encoding 206c, av state encoding 206d, and agent state encoding 206e) using a sequence encoder 208. The sequence encoder can be any appropriate neural network that updates each encoding based on the sequence of encodings, e.g., a transformer or a neural network that includes one or more multicontext gating blocks. Using a neural network that incorporates each other encoding as context for an encoding to generate a respective alternative representation of the encoding can enable the system to achieve better performance than other standard planning models, e.g., to enable the autonomous vehicle to successfully navigate through the environment a higher percentage of the time.

The trajectory planning system 200 processes the alternative representations using a decoder network 214. The decoder network 214 obtains a set of learned queries (e.g., learned queries 212a, 212b, 212c, 212d, 212e, and 212f), where each learned query corresponds to a candidate trajectory, and updates the learned queries (e.g., updated queries 216a, 216b, 216c, 216d, 216e, and 216f) using the alternative representations. For example, the decoder network 214 can include one or more blocks, where each block receives the current set of queries (i.e., the learned queries for the first block or the set of queries as updated by the previous block), and updates the queries in the current set of queries. The blocks can include one or more cross-attention blocks and one or more self-attention blocks. The cross-attention blocks can incorporate the encoder information together with the learned queries, while self-attention blocks can allow the candidate trajectories represented by the learned queries to observe each other. That is, cross-attention blocks can update the learned queries using the alternative representations as the key and value pairs. The self-attention blocks can update the learned queries using the updated learned queries from the previous layer (or the original learned queries, if the first block in a sequence of blocks) to generate the query, key, and value triplets. The output of the decoder neural network can be the updated queries generated from the final block of the neural network.

The trajectory planning system 200 generates trajectory planning output 152 using a trajectory probability network 218 and a trajectory regression network 220. The trajectory planning output 152 includes a respective trajectory score and regression output for each candidate trajectory. For example, the trajectory scores and regression outputs can collectively define a Gaussian mixture model.

The trajectory probability 218 network generates a respective trajectory score for each of the candidate trajectories by processing the updated query corresponding to the candidate trajectory (e.g., trajectory score 222a by processing updated query 216a, trajectory score 222b by processing updated query 216b, etc.). Each trajectory score represents a predicted likelihood that the candidate trajectory is closest to a trajectory that would result in the autonomous vehicle successfully navigating the intended route after the current time point. Each trajectory score can be represented by, e.g., a numerical value.

The trajectory probability neural network head can have any appropriate neural network architecture that enables it to perform its described function, i.e., processing an updated query to generate a respective trajectory score for the candidate trajectory corresponding to the updated query. In particular, each trajectory probability neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers).

The trajectory regression network 220 generates a regression output for each candidate trajectory by processing the updated query corresponding to the candidate trajectory (e.g., regression output 224a by processing updated query 216a, regression output 224b by processing updated query 216b, etc.). Each regression output characterizes a probability distribution that defines, for each of a plurality of future time points after the current time point corresponding to the candidate trajectory, respective likelihoods that the autonomous vehicle will occupy respective spatial positions at the future time point given that the candidate trajectory is the closest to a trajectory that would result in the autonomous vehicle successfully navigating the intended route after the current time point. Each regression output can be represented by, e.g., a set of numerical values for each time point that characterize the state of the autonomous vehicle, such as position, speed, heading, and uncertainty of the position at the time point. In one implementation, the values for each time point can include an x position, y position, yaw, uncertainty in the x position, and uncertainty in the y position at the time point. These values can be, e.g., relative to the current position of the autonomous vehicle.

The trajectory regression neural network head can have any appropriate neural network architecture that enables it to perform its described function, i.e., processing an updated query to generate a respective regression output for the candidate trajectory corresponding to the updated query. In particular, each trajectory regression neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration (e.g., as a linear sequence of layers).

Figure 3:
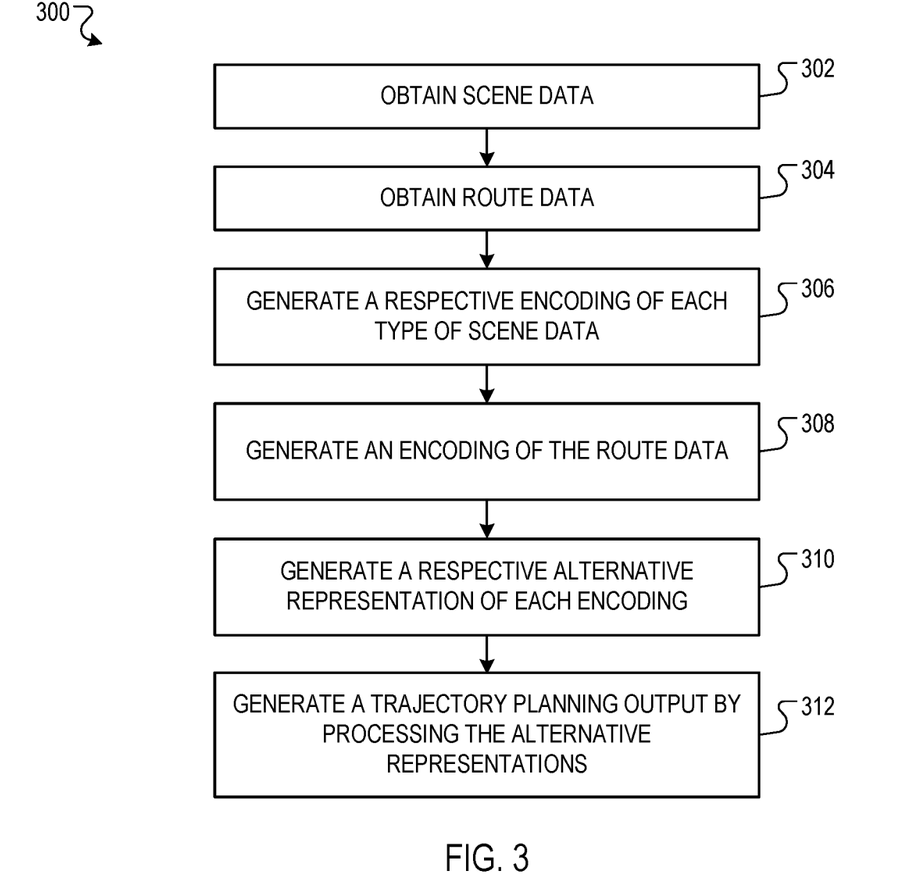
FIG. 3 is a flow diagram of an example process for generating a trajectory planning output for an autonomous vehicle.

FIG. 3 is a flow diagram of an example process 300 for generating a trajectory planning output. For convenience, the process 300 will be described as being performed by a system of one or more computers located in one or more locations. For example, a trajectory planning system, e.g., the trajectory planning system 200 of FIG. 2, appropriately programmed in accordance with this specification, can perform the process 300.

The system obtains scene data (302). The scene data can include multiple types of scene data, e.g., agent state data characterizing respective states of the one or more agents as of the current time point, autonomous vehicle data characterizing a state of the autonomous vehicle as of the current time point, static state data characterizing static features of the scene, dynamic state data characterizing dynamic features of the scene.

The state data characterizing a respective state of the autonomous vehicle can be represented by, e.g., a history of the position, velocity, and heading of the autonomous vehicle at each of multiple past time points before the current time point. The respective state data characterizing each of the one or more agents can also be represented by, e.g., a history of the position, velocity, and heading of the agent at each of multiple past time points before the current time point.

The system obtains route data (304). The route data can include data characterizing an intended route for the autonomous vehicle after the current time point. For example, route data characterizing the intended route of the autonomous vehicle can be represented by an ordered series of positions along the route.

In some implementations, the trajectory planning system can also process hint data from a planning system in addition to the scene data and route data to generate the trajectory planning output. The planning system can generate the hint data to control the trajectory planning output generated by the trajectory planning system. The hint data can characterize a future state of the environment, (e.g., a future state of the autonomous vehicle or an agent in the environment), semantic information pertaining to the autonomous vehicle (such as a control decision for the autonomous vehicle to turn left, turn right, or go straight), or semantic information pertaining to an agent in the environment (e.g., whether the autonomous vehicle should pass the agent while following the intended route). The trajectory planning system receiving hint data in addition to the scene data and route data is described in further detail with reference to FIG. 4.

The system generates a respective encoding of each type of scene data (306). For each type of scene data, the system generates the respective encoding by processing at least the type of scene data using a respective encoder neural network. Each encoding of a type of scene data can be represented by, e.g., a single vector of numerical values. The encoder neural networks can have any appropriate respective architectures that enable them to perform their described function, i.e., processing at least the respective data type to generate an encoding of that data type, as is discussed above with respective to FIG. 2 in further detail.

The system generates a respective encoding of the route data (308) using a route data encoder neural network. The encoding for the route data can be represented by a single vector, e.g., a single vector of numerical values characterizing the route data. The route data encoder can have any appropriate architecture that allows it to process the route data to generate a respective encoding of the route data, as is discussed above with further detail with respective to FIG. 2.

The single vector encodings for the scene data characterize the scene at each of multiple previous time points before the current time point, and the system processes the sequence of single vector encodings to generate the trajectory planning output.

The system generates a respective alternative representation of each encoding (310) by processing a sequence of the encodings. The system can generate the respective alternative representations by processing the sequence of encodings using an encoder neural network, e.g., a transformer or a series of multicontext gating blocks.

The system generates a trajectory planning output by processing the alternative representations (312) using a decoder neural network. The decoder neural network can generate the respective score for each of a set of candidate trajectories by processing the alternative representations. For example, the decoder neural network can obtain a set of learned queries, each learned query corresponding to one of the candidate trajectories, and update the learned queries using the alternative representations. Then, the decoder neural network can process each of the updated queries using a trajectory probability neural network head to generate the respective scores of the trajectory planning output, as is discussed in further detail with respect to FIG. 2.

Figure 4:
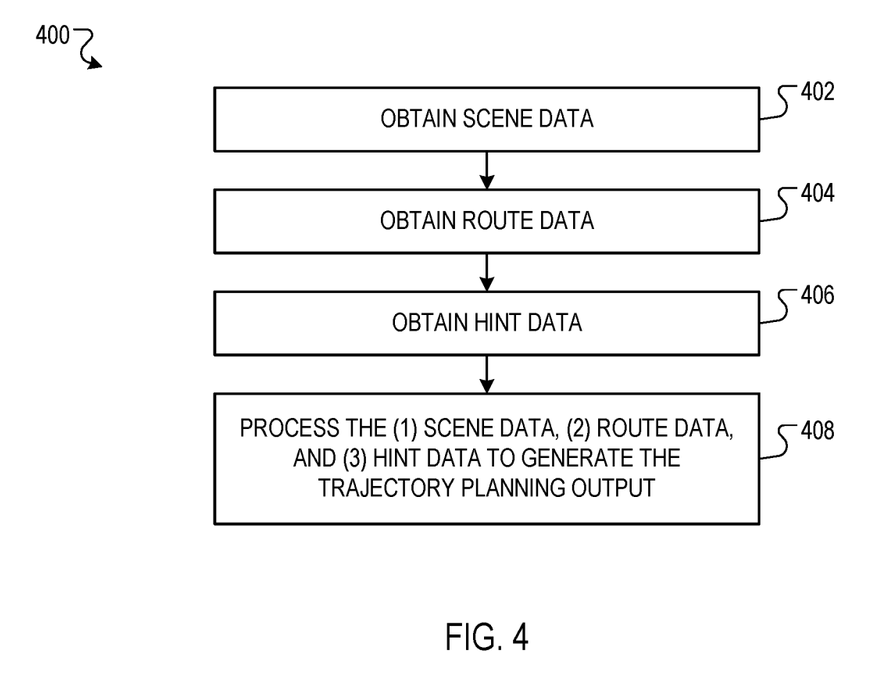
FIG. 4 is a flow diagram of an example process for processing hint data.

FIG. 4 is a flow diagram of an example process for processing hint data. For convenience, the process 400 will be described as being performed by a system of one or more computers located in one or more locations. For example, a trajectory planning system, e.g., the trajectory planning system 200 of FIG. 2, appropriately programmed in accordance with this specification, can perform the process 300.

The system obtains scene data (402). The system can obtain scene data including, e.g., autonomous vehicle state data characterizing a history of states of the autonomous vehicle, agent state data characterizing a history of states for one or more agents in the environment, dynamic scene data characterizing dynamic features of the environment, and static scene data characterizing static features of the environment.

The system obtains route data (404) characterizing an intended route for the autonomous vehicle in the environment. The intended route can be, e.g., an ordered series of positions in the environment.

The system obtains hint data (406). A planning system can generate the hint data in order to control the trajectory planning output generated by the trajectory planning system (e.g., to take certain actions, or take certain paths while following the intended route). The hint data can characterize a future state of the environment (e.g., a future state of the autonomous vehicle or an agent in the environment), semantic information pertaining to the autonomous vehicle (such as a control decision for the autonomous vehicle to turn left, turn right, or go straight), or semantic information pertaining to an agent in the environment (e.g., whether the autonomous vehicle should pass the agent while following the intended route).

In one particular example, the hint data can characterize semantic information with an affirmative decision, negative decision, and an unspecified decision (e.g., whether to pass another agent in the environment or to take an unprotected turn into oncoming traffic). An unspecified option enables greater flexibility in the use of hint data when the intended outcome is uncertain (e.g., during inference), or in evaluating the system when is does not have access to explicit hint data. Providing an unspecified decision can facilitate ensuring the trajectory planning system does not become dependent on the hint data.

The system can be trained to process the hint data in addition to the scene data and route data using any appropriate imitation learning technique, e.g., a behavior cloning technique, an adversarial imitation learning technique, or a DAgger (data aggregation) imitation learning technique from driving logs generated by other autonomous vehicles or manually driven vehicles. During training, the hint data can characterize a future state of the environment in the ground truth future trajectory that is currently being imitated by the system. The ground-truth future state can be obtained from a data store, e.g., of manually driven cars in a real-world environment, autonomous agents operating in a real-world environment, or of synthetic data generated using simulations of vehicles operating in a virtual environment. The training can include an optimization technique, e.g., dropout, that keeps the system from being too dependent on the hint data.

During inference, the hint data can characterize an intended future state of the environment, e.g., generated by a planning system on-board the autonomous vehicle. The intended future state of the environment can represent, e.g., an intended future position of the autonomous vehicle, an intended future control decision for the autonomous vehicle, or semantic information for an agent or object in the environment. The planning system can generate the hint data in order to control the trajectory planning outputs generated by the system after training. For example, the planning system can "hint" that the system should generate a trajectory planning output that results in the autonomous vehicle passing another agent, taking a particular turn, or ending a particular segment of the trajectory in a particular location. Controlling the trajectory planning outputs generated by the system can be useful to facilitate safe operation, and in situations where the system can have difficulty (e.g., "hinting" to the system to pass a double-parked vehicle where the system might mistake the double-parked vehicle as being in traffic and therefore might wait behind the vehicle).

The system processes the (1) scene data, (2) route data, and (3) hint data to generate the trajectory planning output (408). The system can process the scene data and route data to generate the trajectory planning output while being conditioned on the hint data. Generally, any appropriate neural network architecture that is compatible with the trajectory planning system can be used to process the hint data. In some implementations, the system can augment one or more types of scene data with the hint data. For example, for information about one of the agents, the vector(s) representing the state of the agent can be augmented with one or more entries specifying the information, e.g., an entry that is +1 if the autonomous vehicle is to pass the agent, a zero for an unspecified decision, or a −1 if the autonomous vehicle is not to pass the agent. In another example, for the intended route, the vector(s) representing the intended route can be augmented to include additional information representing the intended future state of the agent (e.g., one or more entries representing particular points along the intended route that the autonomous vehicle should follow). In some implementations, the system can include an additional encoder for encoding the hint data, where the encoding of the hint data can be added to the sequence of encodings that is processed by the sequence encoder to generate the alternative representations of the encodings.

Supplying hint data to the trajectory planning system can enable a degree of controllability over the system, which can enable fine-tuning the performance of the autonomous vehicle in a semantic way, such as performing particular control decisions in particular situations (e.g., turning left or right, or passing a particular agent), or following a particular route through the environment (e.g., following the intended route).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining scene data characterizing a scene in an environment that includes, at a current time point, an autonomous vehicle and one or more agents;
   receiving route data specifying an intended route for the autonomous vehicle after the current time point, the route data comprising waypoint locations for the autonomous vehicle at a plurality of future time points;
   generating a respective alternative representation for each of (i) the route data and (ii) scene data; and
   processing the respective alternative representations for each of (i) the route data and (ii) scene data using a decoder neural network to generate a trajectory planning output that comprises a respective score for each of a plurality of candidate future trajectories for the autonomous vehicle, comprising: obtaining a set of queries comprising a respective learned query for each of the plurality candidate trajectories; and
   processing the respective learned queries using a sequence of one or more context neural network blocks, wherein each context neural network block is configured to update the set of queries, and wherein one or more of the context neural network blocks are each configured to update the set of queries using the respective alternative representations for each of (i) the route data and (ii) the scene data.

2. The method of claim 1, wherein the scene data is a plurality of types of scene data comprising one or more of agent data characterizing respective states of the one or more agents as of the current time point, autonomous vehicle data characterizing a state of the autonomous vehicle as of the current time point, and static state data characterizing static features of the scene, and wherein generating the respective alternative representation for each of (i) the route data and (ii) the scene data further comprises:
  encoding at least the route data using a route data encoder neural network; and
  for each of the plurality of types of scene data, encoding at least the scene data of the type using a respective encoder neural network of a plurality of encoder neural networks.

3. The method of claim 2, wherein the static state data comprises roadgraph data.

4. The method of claim 2, wherein the plurality of types of scene data further comprises dynamic state data characterizing dynamic features of the scene.

5. The method of claim 4, wherein the dynamic state data comprises traffic light state data.

6. The method of claim 4, wherein the respective encoder neural network corresponding to the dynamic state data is a dynamic feature encoder neural network, wherein the dynamic feature encoder neural network comprises one or more LSTM neural network layers.

7. The method of claim 2 wherein the respective encoder neural network corresponding to the agent state data is an interaction encoder neural network, wherein the interaction encoder neural network processes at least the agent state data and the autonomous vehicle data.

8. The method of claim 7, where the interaction encoder neural network comprises one or more multicontext gating neural network blocks, wherein the multicontext gating neural network block at each of a plurality of iterations updates a respective context vector and one or more feature vectors, wherein updating the context vector and the feature vectors comprises:
  obtaining the initial context vector and the initial feature vectors;
  at each of a plurality of iterations:
    processing the current feature vectors using a feature neural network to generate a respective representation of each of the feature vectors;
    processing the current context vector using a context neural network to generate a representation of the context vector;
    for each feature vector, determining the updated feature vector as the elementwise multiplication of the representation of the feature vector and a function of the representation of the context vector; and
    determining the updated context vector using a pooling layer to process the updated feature vectors.

9. The method of claim 2, wherein the respective encoder neural network corresponding to the autonomous vehicle data is a raw state encoder neural network, wherein the raw state encoder neural network comprises one or more LSTM neural network layers.

10. The method of claim 2, wherein the static scene data and route data are represented as one or more polylines.

11. The method of claim 10, wherein the respective encoder neural network corresponding to the static scene data is a polyline encoder neural network, wherein the polyline encoder neural network processes at least data characterizing polylines representing the static scene data and the route data.

12. The method of claim 11, wherein the polyline encoder comprises one or more multicontext gating neural network blocks, wherein the multicontext gating neural network block at each of a plurality of iterations updates a respective context vector and one or more feature vectors, wherein updating the context vector and the feature vectors comprises:
  obtaining the initial context vector and the initial feature vectors;
  at each of a plurality of iterations:
    processing the current feature vectors using a feature neural network to generate a respective representation of each of the feature vectors;
    processing the current context vector using a context neural network to generate a representation of the context vector;
    for each feature vector, determining the updated feature vector as the elementwise multiplication of the representation of the feature vector and a function of the representation of the context vector; and
    determining the updated context vector using a pooling layer to process the updated feature vectors.

13. The method of claim 2, wherein the route data encoder neural network comprises one or more 1D dilated convolutional layers.

14. The method of claim 2, further comprising:
  receiving hint data that characterizes an intended future state of the scene of the environment after the current time point, wherein:
    (i) one or more of the respective encoders for the plurality of types of scene data, (ii) the route data encoder, or (iii) both are conditioned on the hint data; and
  wherein the predicted likelihood is a predicted likelihood that the candidate trajectory is closest to a trajectory that would result in the autonomous vehicle successfully navigating the intended route after the current time point given that the scene transitions into the intended future state after the current time point.

15. The method of claim 1, wherein processing the respective alternative representations for each of (i) the route data and (ii) scene data using a decoder neural network further comprises:
  processing the updated set of queries generated by a last context neural network block in the sequence using a trajectory probability neural network head to generate the respective scores for each of the plurality of candidate trajectories.

16. The method of claim 1, wherein the trajectory planning output further comprises, for each of the plurality of candidate trajectories, a respective regression output that characterizes a probability distribution that defines, for each of a plurality of future time points after the current time point corresponding to the candidate trajectory, respective likelihoods that the autonomous vehicle will occupy respective spatial positions at the future time point given that the candidate trajectory is the closest to a trajectory that would result in the autonomous vehicle successfully navigating the intended route after the current time point.

17. The method of claim 16, wherein processing the respective alternative representations for each of (i) the route data and (ii) scene data using a decoder neural network further comprises:
  processing the updated set of queries generated by a last context neural network block in the sequence using a trajectory regression neural network head to generate the respective regression output for each of the plurality of candidate trajectories.

18. A system comprising:
  one or more computers; and
  one or more storage devices communicatively coupled to the one or more computers, wherein the one or more storage devices store instructions that, when executed by the one or more computers, cause the one or more computers to perform operations for planning the future trajectory of an autonomous vehicle in an environment, the operations comprising:

obtaining a plurality of types of scene data characterizing a scene in an environment that includes, at a current time point, an autonomous vehicle and one or more agents;

receiving route data specifying an intended route for the autonomous vehicle after the current time point, the route data comprising waypoint locations for the autonomous vehicle at a plurality of future time points;

generating a respective alternative representation for each of (i) the route data and (ii) scene data; and processing the respective alternative representations for each of (i) the route data and (ii) scene data using a decoder neural network to generate a trajectory planning output that comprises a respective score for each of a plurality of candidate future trajectories for the autonomous vehicle, comprising: obtaining a set of queries comprising a respective learned query for each of the plurality candidate trajectories; and processing the respective learned queries using a sequence of one or more context neural network blocks, wherein each context neural network block is configured to update the set of queries, and wherein one or more of the context neural network blocks are each configured to update the set of queries using the respective alternative representations for each of (i) the route data and (ii) the scene data.

19. The system of claim 18, wherein the scene data is a plurality of types of scene data comprising one or more of agent data characterizing respective states of the one or more agents as of the current time point, autonomous vehicle data characterizing a state of the autonomous vehicle as of the current time point, and static state data characterizing static features of the scene, and wherein generating the respective alternative representation for each of (i) the route data and (ii) the scene data further comprises:

encoding at least the route data using a route data encoder neural network; and for each of the plurality of types of scene data, encoding at least the scene data of the type using a respective encoder neural network of a plurality of encoder neural networks.

20. One or more non-transitory computer storage media storing instructions that when executed by one or more computers cause the one or more computers to perform operations for planning the future trajectory of an autonomous vehicle in an environment, the operations comprising:

obtaining scene data characterizing a scene in an environment that includes, at a current time point, an autonomous vehicle and one or more agents;

receiving route data specifying an intended route for the autonomous vehicle after the current time point, the route data comprising waypoint locations for the autonomous vehicle at a plurality of future time points;

generating a respective alternative representation for each of (i) the route data and (ii) scene data; and processing the respective alternative representations for each of (i) the route data and (ii) scene data using a decoder neural network to generate a trajectory planning output that comprises a respective score for each of a plurality of candidate future trajectories for the autonomous vehicle, comprising: obtaining a set of queries comprising a respective learned query for each of the plurality candidate trajectories; and processing the respective learned queries using a sequence of one or more context neural network blocks, wherein each context neural network block is configured to update the set of queries, and wherein one or more of the context neural network blocks are each configured to update the set of queries using the respective alternative representations for each of (i) the route data and (ii) the scene data.

* * * * *